United States Patent
Hatsch et al.

(10) Patent No.: US 6,978,290 B2
(45) Date of Patent: Dec. 20, 2005

(54) CARRY RIPPLE ADDER

(75) Inventors: Joel Hatsch, München (DE); Winfried Kamp, München (DE); Siegmar Köppe, Laatzen (DE); Ronald Künemund, Dietramszell (DE); Eva Lackerschmid, München (DE); Heinz Söldner, Bruckmühl-Heufeldmühle (DE)

(73) Assignee: Infineon Technologies AG, Munich (DE)

( * ) Notice: Subject to any disclaimer, the term of this patent is extended or adjusted under 35 U.S.C. 154(b) by 598 days.

(21) Appl. No.: 10/116,851

(22) Filed: Apr. 5, 2002

(65) Prior Publication Data

US 2002/0147756 A1    Oct. 10, 2002

(30) Foreign Application Priority Data

Apr. 5, 2001   (DE)   ................. 101 17 041

(51) Int. Cl.⁷ .............................................. G06F 7/50
(52) U.S. Cl. ..................................................... 708/709
(58) Field of Search ........................................ 708/709

(56) References Cited

U.S. PATENT DOCUMENTS

| | | | | | |
|---|---|---|---|---|---|
| 3,535,502 | A | * | 10/1970 | Clapper | 708/685 |
| 3,636,334 | A | * | 1/1972 | Svoboda | 708/709 |
| 3,675,001 | A | * | 7/1972 | Singh | 708/709 |
| 3,723,715 | A | * | 3/1973 | Chen et al. | 708/709 |
| 6,729,168 | B2 | * | 5/2004 | Hossain | 70/210 |

FOREIGN PATENT DOCUMENTS

EP    0 571 694 B1    12/1993

* cited by examiner

*Primary Examiner*—D. H. Malzahn
(74) *Attorney, Agent, or Firm*—Laurence A. Greenberg; Werner H. Stemer; Ralph E. Locher

(57) ABSTRACT

A carry ripple adder contains five first inputs for accepting five input bits having equal significance w that are to be summed and two second inputs for accepting two carry bits having the significance w. It also contains an output for a sum bit having the significance w and two outputs for two carry bits having the significances 2w and 4w.

7 Claims, 9 Drawing Sheets

Fig. 4

CARRY RIPPLE ADDER

BACKGROUND OF THE INVENTION

FIELD OF THE INVENTION

The invention relates to a carry ripple adder and also to an accelerated carry adder for summing a plurality of bit sets. The bits contained in one bit set have the same significance and bits in different bit sets have different significances. Each bit set has an associated bit set adder which, taking into account carries obtained when summing bit sets which have a relatively low significance, calculates a bit having the significance of the respective bit set.

Carry ripple (CR) adders are also known in the art as adders with parallel carry logic. In comparable fashion to a carry save (CS) adder, they have a plurality of inputs having equal significance and, when operating, sum the bits applied to the inputs. The sum of the bits is output at outputs having different significances, i.e. in binary coded numerical notation, for example.

A fundamental feature of CR adders is that their inputs—unlike in the case of CS adders—are not of equal authority within the meaning of being arbitrarily interchangeable. This is explained below using the example of a known 3-to-2 CR adder (referred to below as "2and1-to-2 CR adder" in order to distinguish the inputs without equal authority).

The 2and1-to-2 CR adder contains two first inputs for accepting a respective input bit and a third input, to which a carry bit which is output by a 2and1-to-2 CR adder adding bits having the next lowest significance is applied. The 2and1-to-2 CR adder has two outputs, with one of the outputs outputting a sum bit having the significance of the input bits for the adder, while the other output is a carry output which outputs the aforementioned carry bit for the 2and1-to-2 CR adder in order to sum bits having the next highest significance.

Hence, CR adders always require a carry bit to be taken into account in the calculation of the sum bit, which, in fact, must first be calculated in advance in the CR adder having the next lowest significance. To prevent a time-intensive calculation operation from ensuing in this case, CR adders ensure, by virtue of suitable internal circuit and gate configurations, that the carry bit can be calculated from the input bits using as few gates as possible in the critical path between the carry input ("carry in") and the carry output ("carry out"). In this way, the overall carry path is optimized, since it contains as few gates as possible.

The 2and1-to-2 CR adder can add only two bits. To add three or more binary numbers, it is necessary to add a correspondingly higher number of bits per position. Normally, more than two bits having equal significance are added using a Wallace Tree (WT) adder. A WT adder is a multistage adder that reduces the number of bits to be added in each stage. The individual stages of a WT adder are constructed from 3-to-2 CS full adders disposed in parallel with one another. With each stage, the number of CS full adders required is reduced. As soon as the number of bits to be summed has been reduced to the value 2, the last, terminal stage used is the aforementioned 2and1-to-2 CR adder.

SUMMARY OF THE INVENTION

It is accordingly an object of the invention to provide a carry ripple adder that overcomes the above-mentioned disadvantages of the prior art devices of this general type, which can be used advantageously in a multiplicity of adder configurations. In particular, it is intended to provide the option of an adder for summing a plurality of bit sets that needs few stages in order to sum a bit set and permits a high adding speed.

With the foregoing and other objects in view there is provided, in accordance with the invention, a carry ripple adder. The carry ripple adder contains five first inputs for receiving five input bits of equal significance w that are to be summed, two second inputs for receiving two carry bits, a first output for a sum bit having the significance w, two second outputs for outputting two further carry bits having significances 2w and 4w, and gates interconnecting the first and second inputs to the first and second outputs.

A fundamental advantage of the inventive 5and2-to-3 CR adder having two carry inputs and two carry outputs is that the full opportunity to represent the three output signals is used to add the total of seven input bits (i.e. the five input bits at the first inputs and the two carry bits at the second inputs). This achieves the ideal exhaustion of the value range that is possible, in principle, with three outputs, as in the case of the 2and1-to-2 CR adder. In addition, the simultaneous production of two carries having different significances results in that the circuit complexity and the internal wiring complexity are lower than in the case of the multistage solution using conventional 3-to-2 carry save and 2and1-to-2 CR adders.

The fact that the inventive CR adder has five first inputs for accepting five input bits having the same significance w which are to be summed results in that, in addition, only inventive CR adders can be used for adding a maximum of five binary numbers (one respective inventive 5and2-to-3 CR adder per position). In this case, no kind of CS adder is required for compressing the input bits for each position.

One particularly preferred embodiment of the inventive 5and2-to-3 CR adder is characterized in that the maximum number of gates between any first input and any of the outputs for the carry bits is 5.

Another preference is that, in the case of the inventive 5and2-to-3 CR adder, the maximum number of gates between any second input (carry input) and any of the outputs for the carry bits is 2. This achieves optimization for the critical path of the inventive CR adder.

The inventive 5and2-to-3 CR adder can be used in a wide variety of ways in relatively large adder structures. Numerous applications require adders which process a plurality of bit sets, where the bits contained in one bit set have the same significance and bits in different sets have different significances. An inventive accelerated carry adder of this type is characterized in that at least one of the bit set adders has an inventive CR adder as the output stage.

With the foregoing and other objects in view there is provided, in accordance with the invention, an accelerated carry adder for summing a plurality of bit sets having bits. The bits contained in one bit set have an equivalent same significance and the bits in different ones of the bit sets have different significances. The accelerated carry adder contains bit set adders with a respective bit set adder for each of the bit sets. Each of the bit set adders takes into account carries received from the bit sets having a lower significance for calculating a bit having the significance of a respective bit set. At least one of the bit set adders contains an adder output and a carry ripple adder disposed at the adder output. The carry ripple adder has five first inputs for receiving five input bits of equal significance w which are to be summed, two second inputs for receiving two carry bits, a first output for a sum bit having a significance w, two second outputs for outputting two further carry bits having significances 2w and 4w, and gates interconnecting the first and second inputs to the first and second outputs.

If all the bit sets contain a maximum of five bits, i.e. in other words a maximum of five binary numbers need to be added by the accelerated carry adder, one advantageous embodiment of the accelerated carry adder is characterized in that all the bit set adders are respectively implemented in one stage in the form of the inventive 5and2-to-3 CR adders, and in that the output for the less significant of the two carry bits is supplied to a second input of the 5and2-to-3 CR adder for the next highest significance, and the output for the more significant of the two carry bits is supplied to a second input of the 5and2-to-3 CR adder for the next highest significance but one.

A preferred accelerated carry adder which is also suitable for adding more than five binary numbers is characterized in that at least one bit set has an associated multistage bit set adder, and in that the output-side stage of the bit set adder is the inventive 5and2-to-3 CR adder. In this case, the input-side adder stages need to reduce the number of bits to be added merely to a value of 5, which results in that, compared to the prior art, in which a 2and1-to-2 CR adder is used at the output, a much smaller number of stages is required.

One particularly preferred embodiment of such an accelerated carry adder is characterized in that, up to the output-side stage, the stages of the bit set adder contain CS adders, disposed in parallel with one another, having a plurality of outputs for carry bits, in particular 7-to-3 CS full adders. This extends the principle used for the 5and2-to-3 CR adder to the CS compression stages, i.e. the general provision of 2 carry bits in each stage results in that inherent parallelization of the summation operation, and hence minimization of the wiring complexity and number of stages, are achieved within each stage. This has a beneficial effect both on the speed and on the space requirement for the overall circuit.

Other features which are considered as characteristic for the invention are set forth in the appended claims.

Although the invention is illustrated and described herein as embodied in a carry ripple adder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a truth table for a 5and2-to-3 CR adder;

DESCRIPTION OF THE PREFERRED EMBODIMENTS

Figure 1:
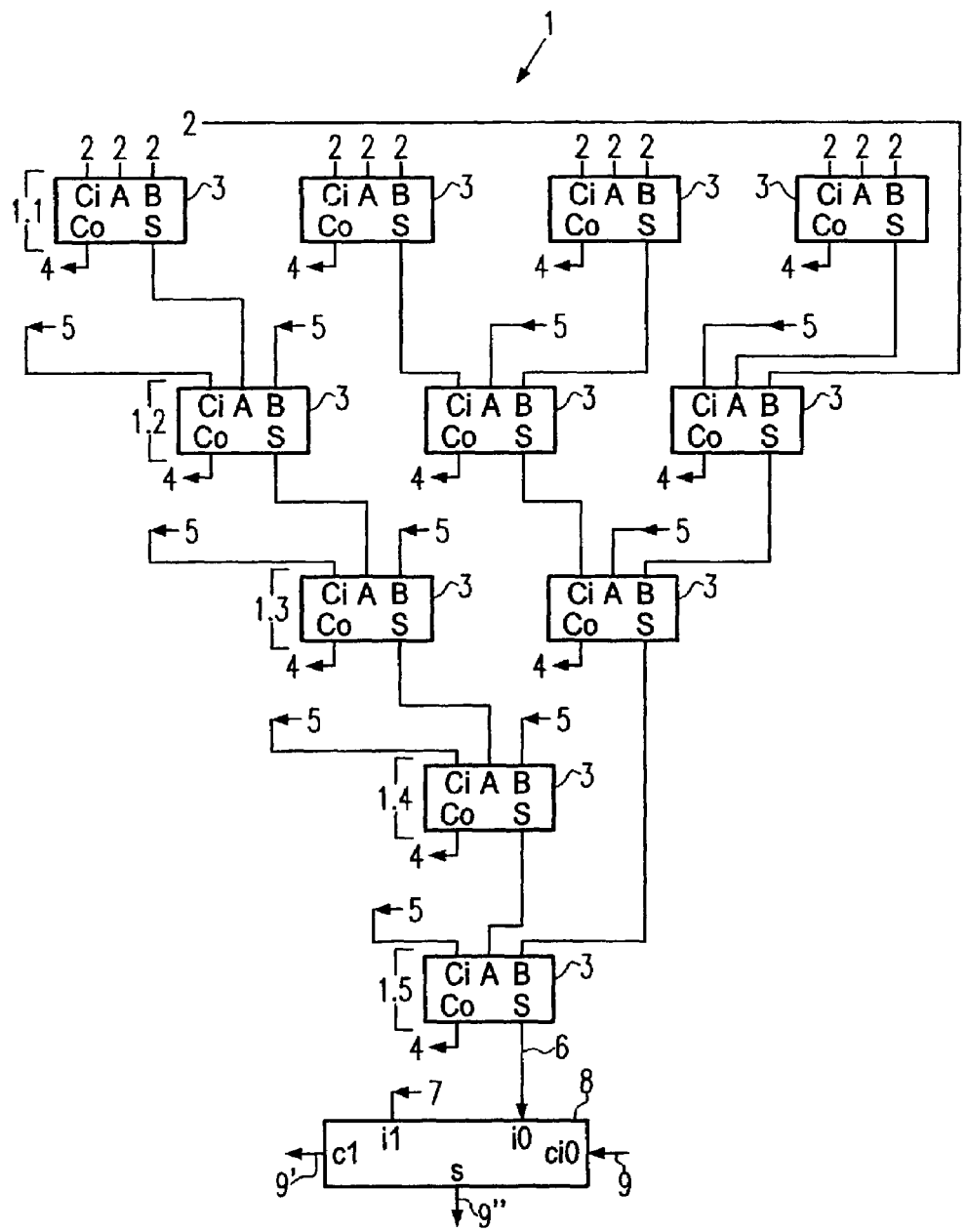
FIG. 1 is a block circuit diagram of an adder tree based on the prior art, which is constructed from 3-to-2 CS adders and is provided with a 2and1-to-2 CR adder at the output.

Referring now to the figures of the drawing in detail and first, particularly, to FIG. 1 thereof, there is shown an adder tree, based on the prior art. The adder tree contains a five-stage WT adder 1 and a 2and1-to-2 CR adder, connected downstream of the WT adder 1, for adding 13 input bits having the same significance.

The WT adder 1 contains a total of 11 3-to-2 CS full adders 3. Each CS full adder 3 has three inputs A, B, Ci and two outputs S, Co. The inputs A and B are provided for accepting two bits which are to be added, and the input Ci (Carry in) is provided for receiving a carry bit. The three inputs A, B, Ci are equivalent.

The output S represents the sum output of the 3-to-2 CS full adder 3. The output S adopts the value zero when there is a bit having the value zero at all the inputs A, B, Ci or when there is a bit having the value 1 at exactly two of the inputs A, B, Ci. Otherwise, S=1. An output Co for the carry (Carry out) adopts the value 1 only when there is a bit having the value 1 at at least two of the inputs. In contrast to the inputs A, B, Ci, the outputs S and Co are not equivalent, i.e. are not interchangeable.

The five stages 1.1, 1.2, 1.3, 1.4, 1.5 of the WT adder 1 contain 4, 3, 2, 1 and 1 CS full adder(s) 3. The 13 inputs of the WT adder are produced by the 12 inputs 2 of the first stage 1.1 and the one input 2 of the second stage 1.2.

While the outputs S of the first stage 1.1 are respectively supplied to the inputs of the CS full adders 3 in the second stage 1.2, the four outputs Co, which provide a carry bit 4, are supplied to a second stage of a non-illustrated WT adder for adding a bit set having a next highest significance. Similarly, the full adders 3 in the second stage 1.2 respectively receive one or two carry bits 5 which are output by a first stage of a non-illustrated WT adder for a bit set having the next lowest significance.

This principle extends over the second 1.2 and third 1.3, third 1.3 and fourth 1.4, and fourth 1.4 and fifth 1.5 stages of the WT adder 1. The output of the WT adder is represented by a sum bit 6 and a partial carry bit 7 coming from the fifth stage of the non-illustrated WT adder 1 having the next lowest significance. These two bits form the inputs i0, i1 of a 2and1-to-2 CR adder 8 which is connected downstream of the WT adder 1 and whose sum output s delivers the sum bit 9" for the bit set under consideration. For this purpose, an input ci0 of the 2and1-to-2 CR adder 8 receives a carry bit 9 which is output by a CR adder for calculating the sum bit having the next lowest significance, and the carry output c1 of the 2and1-to-2 CR adder outputs a carry bit 9' accordingly.

Figure 2:
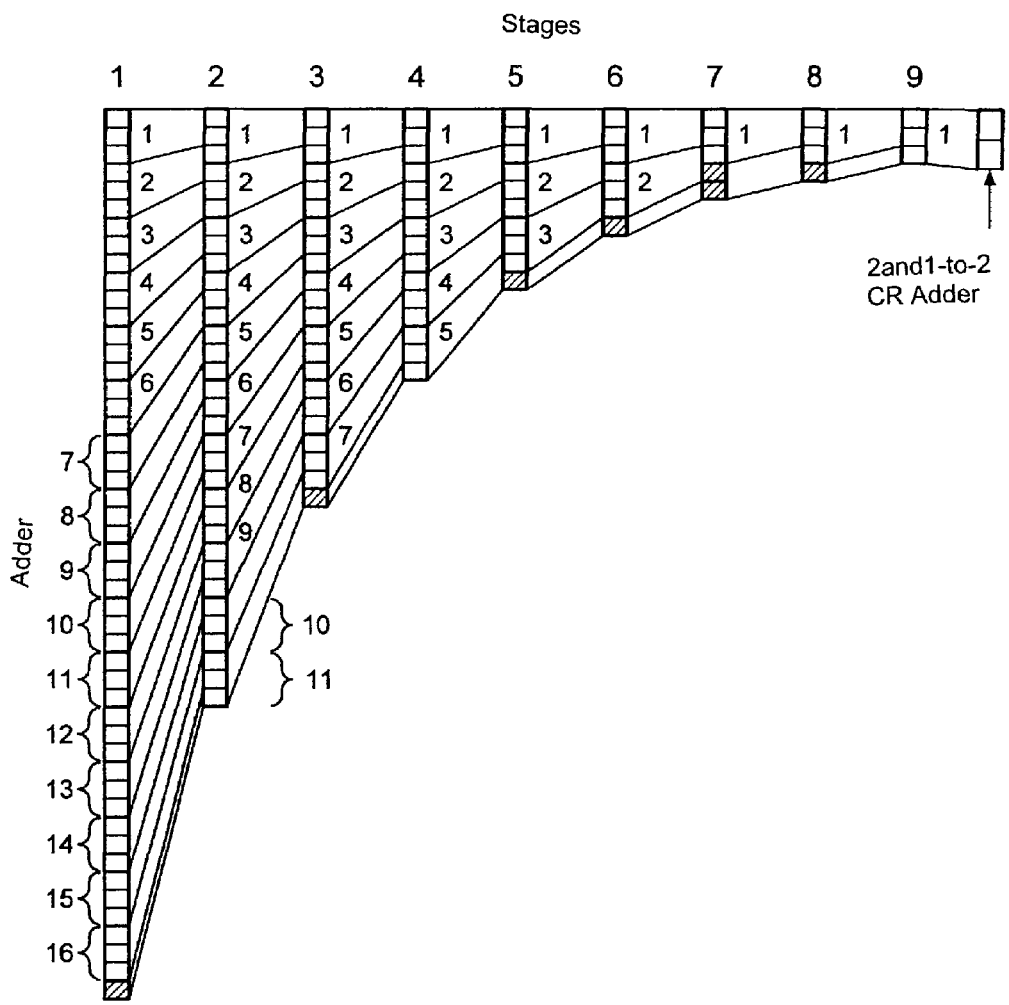
FIG. 2 is a stage diagram for explaining a stage structure of a known adder tree for adding 49 bits having the same significance.

If more than 13 binary numbers need to be added, bit set adders having a correspondingly greater number of inputs are required. FIG. 2 shows the stage structure of such a WT adder having a 2and1-to-2 CR adder as an output stage for adding 49 bits having the same significance. The illustration shows the input bits for each stage as a column of boxes. Each box corresponds to one input bit. Input bits shown with shading are not processed in the corresponding stage, but rather are passed directly to the next stage. Since a WT adder in each stage accepts carry bits from a non-illustrated adjacent WT adder having the next lowest significance and equally outputs carry bits for a non-illustrated WT adder having the next highest significance (see FIG. 1). FIG. 2 should be understood not as a circuit diagram, but rather solely as a stage balance illustration.

FIG. 2 only shows that a total of 9 WT adder stages and one CR output stage are required for adding the 49 bits. The first stage has 16 3-to-2 CS full adders, and the subsequent stages contain 11, 7, 5, 3, 2, 1, 1 3-to-2 CS full adders. The last stage is a 3-to-2 full adder which is in the form of a 2and1-2 bit CR adder, that is to say receives a carry bit from a 2and1-to-2 CR adder in the non-illustrated adjacent bit set adder having the next lowest significance.

Figure 3:
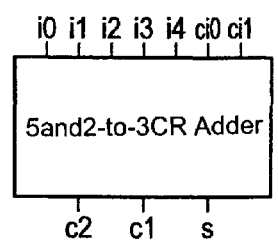
FIG. 3 is a circuit diagram of a 5and2-to-3 CR adder according to the invention.

FIG. 3 shows a schematic illustration of an inventive 5and2-to-3 CR adder. The adder has the inputs i0, i1, i2, i3, i4, ci0, ci1 and the outputs s, c1, c2. The inputs i0 to i4 are inputs for five input bits having the same significance, while the inputs ci0, ci1 are provided for two carry bits, likewise having the same significance. All the inputs are equivalent in terms of their logic functionality, i.e. ultimately seven bits are added.

Differences arise in the timing response of the inputs. The inputs i0 to i4 have an identical timing response, i.e. they can be interchanged among one another. The inputs ci0, ci1 can likewise be interchanged among one another but, in comparison with the first-mentioned inputs i0 to i4, have an optimized (shorter) delay time.

The addition of seven bits covers a value range between zero and seven. The three outputs of the 5and2-to-3 CR adder represent a sum of the bits which are at the inputs in binary coded form. The output s for the sum bit has the same significance as the set of input bits i0 to i4 and ci0, ci1. The output c1 is a carry output having a significance that is higher by a factor of 2 than that of the output s for the sum bit. The output c2 is likewise an output for a carry bit, but again having a significance that is higher by a factor of 2 than that of the output c1. In other words, the outputs s, c1 and c2 have the significances $2^0$, $2^1$ and $2^2$ based on the significance of the bit set at the input of the 5and2-to-3 CR adder.

Figure 4:
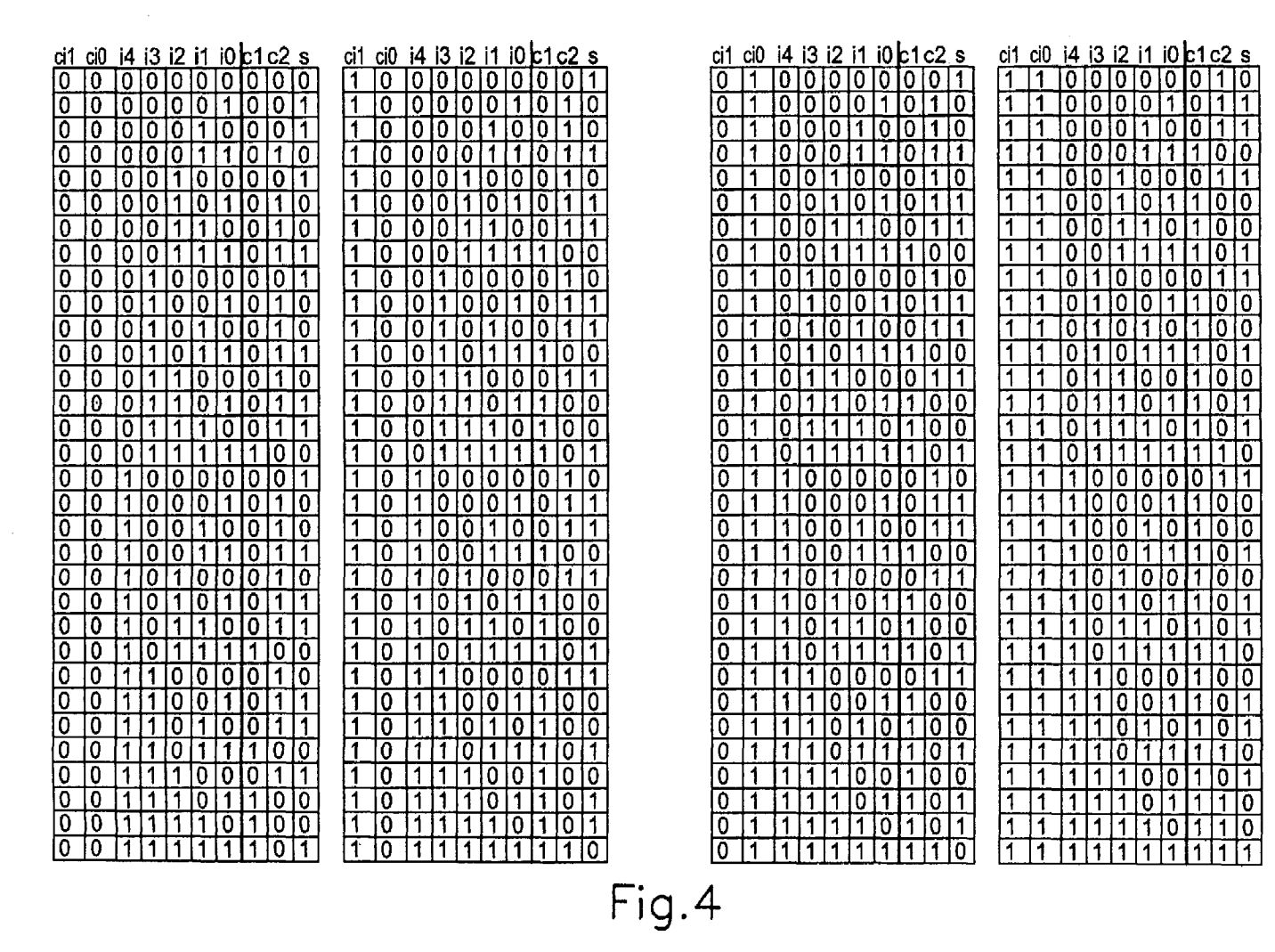

FIG. 4 shows a truth table for the 5and2-to-3 CR adder. It can be seen that the 5and2-to-3 CR adder has the characteristic that the value range for the three output bits becomes completely exhausted. This characteristic, arising, independently of the specific gate implementation of the 5and2-to-3 CR adder, only from the latter's truth table, favors low-complexity production of the inventive 5and2-to-3 CR adder.

Figure 5:
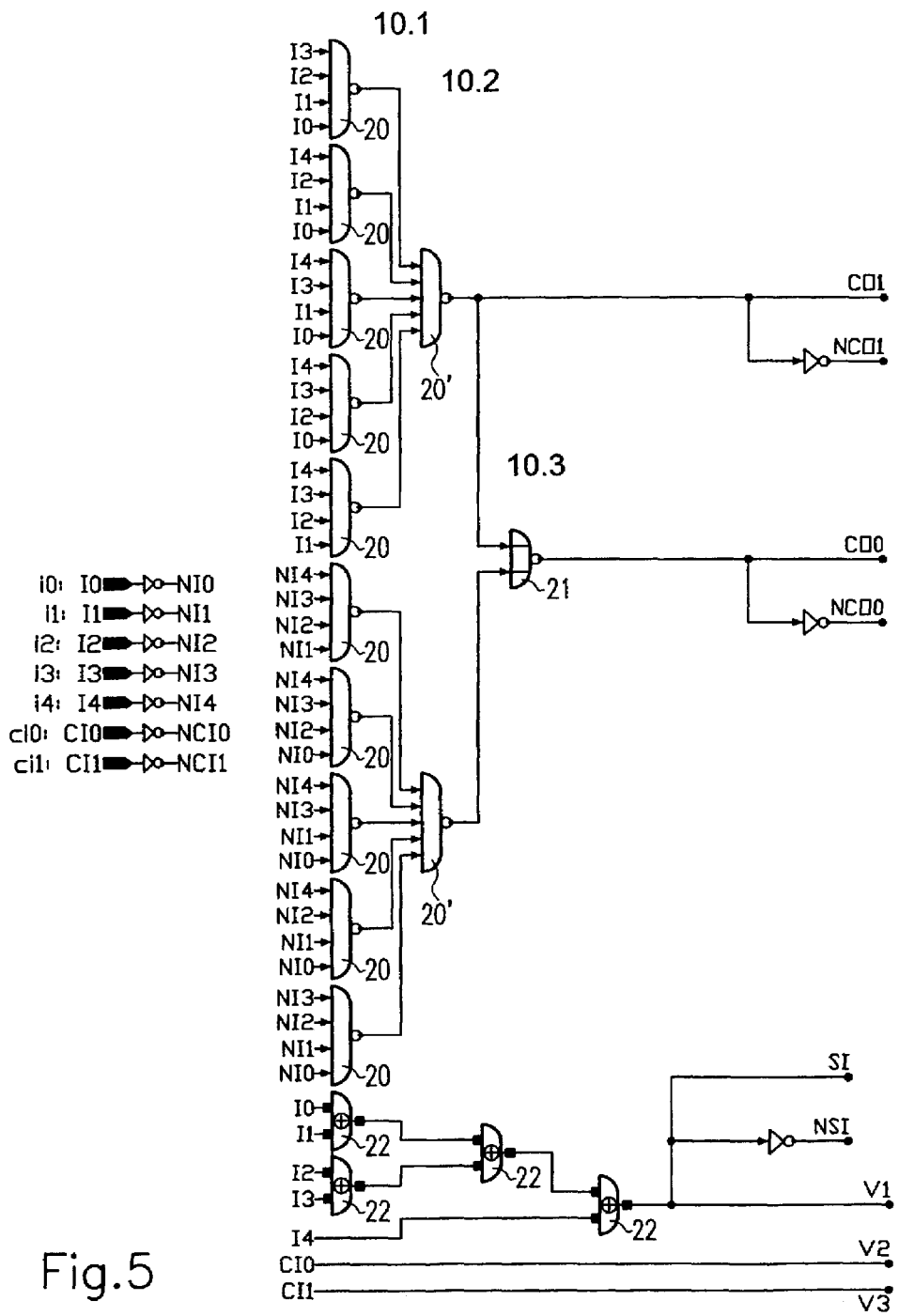
FIG. 5 is a circuit diagram of a first circuit section for the 5and2-to-3 CR adder.
Figure 6:
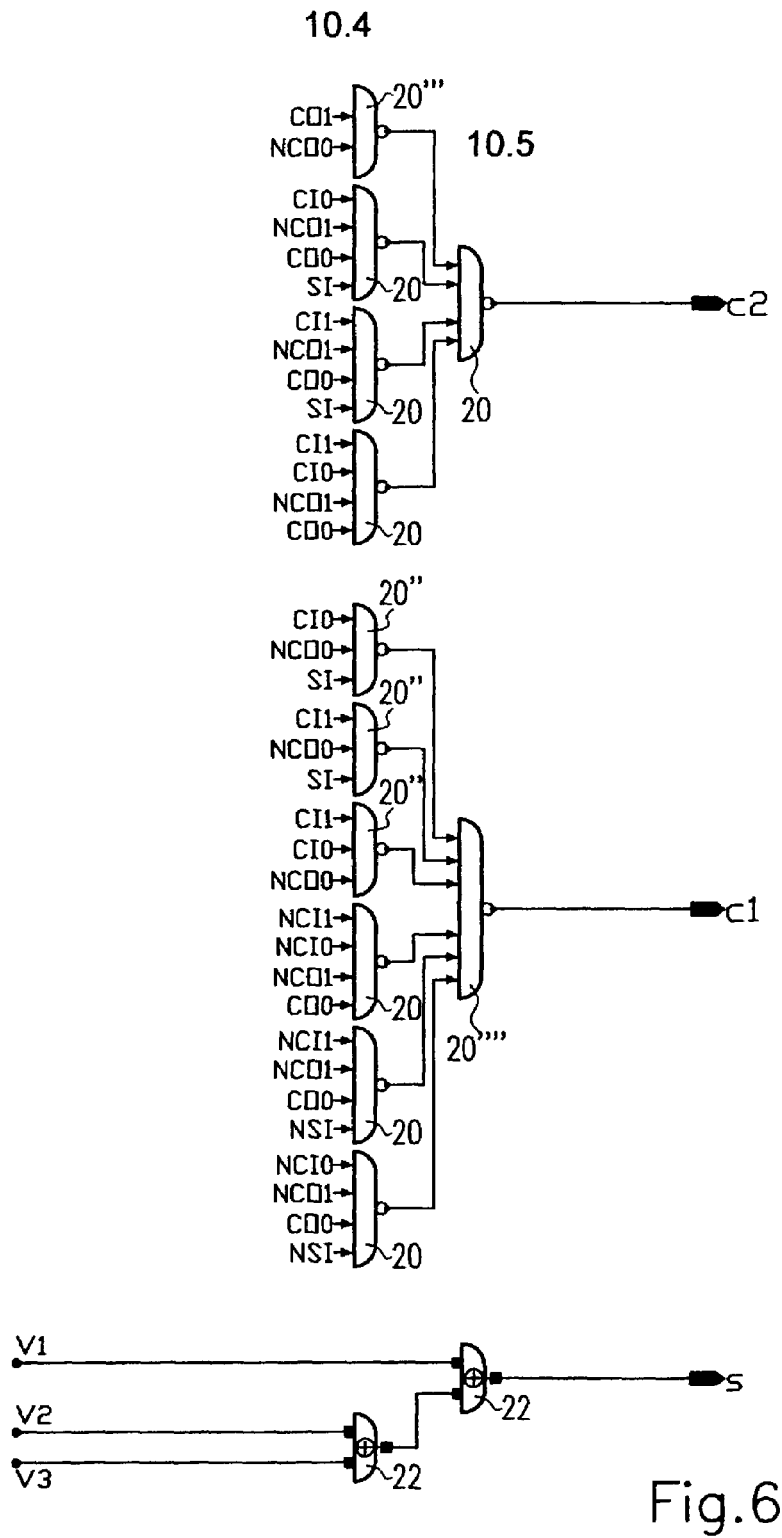
FIG. 6 is a circuit diagram of a second circuit section, adjoining the first section shown in FIG. 5, for the 5and2-to-3 CR adder.

FIGS. 5 and 6 together illustrate the gate structure of an exemplary embodiment of the inventive 5and2-to-3 CR adder. In this case, the inputs i0 to i4, ci0, ci1 are indicated by equivalent reference symbols using capital letters I0 to I4, CI0 and CI1. In this context, NI0 to NI4, NCI0, NCI1 denote the inverted inputs I0 to I4, CI0, CI1. This is shown symbolically in the left-hand part of FIG. 5. V1, V2 and V3 denote junction points between the circuit sections shown in FIGS. 5 and 6.

Looking at FIGS. 5 and 6 together shows that the carry outputs c1 and c2 are dependent on the input at the inputs i0 to i4 and the carry inputs ci0, ci1. To control the carry outputs c1, c2, a 5-stage gate structure is used. A first stage 10.1 contains NAND gates 20 which each have four inputs. The outputs of 5 respective NAND gates 20 are combined and are respectively supplied to one of a total of two NAND gates 20' in the second stage 10.2 of the adder.

The third stage 10.3 is produced by a single NOR gate 21 having two inputs. The two inputs of the NOR gate 21 receive the outputs of the two NAND gates 20' in the second stage 10.2.

For the first carry output c1, a fourth stage 10.4 is constructed using three NAND gates 20, each having four inputs, and three NAND gates 20", each having three inputs. For the second carry output c2, the fourth stage 10.4 has three NAND gates 20, each having four inputs, and one NAND gate 20''', having two inputs.

For the less significant carry output c1, the fifth stage 10.5 has a NAND gate 20'''', having six inputs, and, for the more significant carry output c2, has a NAND gate 20, having four inputs.

The gate configuration for driving the sum output s is likewise in 5 stages. The first stage contains two XOR gates 22 accepting the four inputs i0, i1, i2 and i3. The second to fifth stages each contain a single XOR gate 22.

The circuit diagram shows that the two carry inputs ci0 and ci1 are first routed to the fourth stage 10.4 of the gate structure explained. This applies both to the carry outputs c1, c2 and to the sum output s. Accordingly, the bits for the carry inputs ci0, ci1 will go into the calculation with less of a time delay than the input bits i0 to i4. After the bits have been received at the carry inputs ci0, ci1, only two gate delay times are needed in order to provide the carry bits at the carry outputs c1, c2. Inverters are not taken into account when counting the gates and gate delay times, since they may also be in a form integrated into logic gates.

Figure 7:
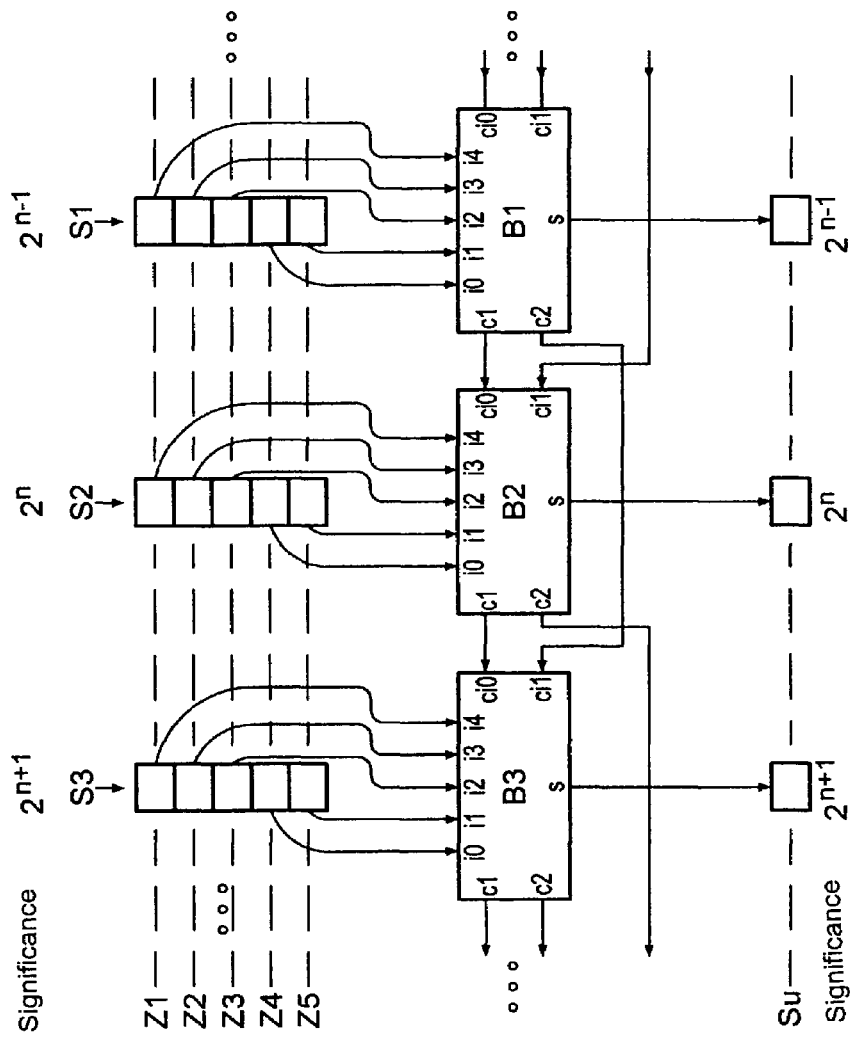
FIG. 7 is a block circuit diagram to explain an inventive accelerated carry adder for 5 binary numbers.

FIG. 7 shows a circuit diagram section for an accelerated carry adder that is able to sum a maximum number of five binary coded numbers Z1, Z2, Z3, Z4 and Z5. Column S1 contains the bits in the n−1th position, column S2 contains the bits in the nth position, and column S3 contains the bits in the n+1th position in the respective binary numbers Z1 to Z5. In this case, n is any integer greater than or equal to one. The bits in column S1 thus have the significance 2n−1, the bits in column S2 have the significance 2n, and the bits in column S3 have the significance 2n+1.

The adder is represented (in a detail illustration) by the three 5and2-to-3 CR adders B1, B2 and B3. The inputs i0 to i4 of the 5and2-to-3 adder B1 accept the bits from column S1. Similarly, the inputs i0 to i4 of the 5and2-to-3 CR adders B2 and B3 are supplied with the bits in columns S2 and S3.

The sum bit outputs s of the 5and2-to-3 CR adders B1, B2, B3 are the n−1th, nth and n+1th positions in the binary sum Su of the numbers Z1 to Z5.

To ensure that the carry between the 5and2-to-3 adders B1, B2 and B3 is handled correctly, the adders are connected in the following manner: the carry output c1 having the lower significance on the 5and2-to-3 CR adder B1 is connected to a carry input (in FIG. 7 the carry input ci0) of the 5and2-to-3 CR adder B2. The carry output c2 having the higher significance on the 5and2-to-3 CR adder B1 is connected to a carry input (in FIG. 7 the carry input ci1) of the 5and2-to-3 CR adder B3. Correspondingly, the carry output C1 having the lower significance on the 5and2-to-3 CR adder B2 is connected to the carry input ci0 of the 5and2-to-3 CR adder B3, and the carry output c2 having the higher significance on the 5and2-to-3 CR adder B2 is routed to a subsequent non-illustrated 5and2-to-3 CR adder provided for summing bits having the significance 2n+2. On the basis of this scheme, the carry input ci1 of the 5and2-to-3 CR adder B2 is connected to the carry output c2 having the higher significance on a preceding non-illustrated 5and2-to-3 CR adder, which sums bits having the significance 2n−2.

FIG. 7 shows that an accelerated carry adder for a maximum of 5 binary numbers can be constructed from a single row of 5and2-to-3 CR adders.

Figures 8, 9:
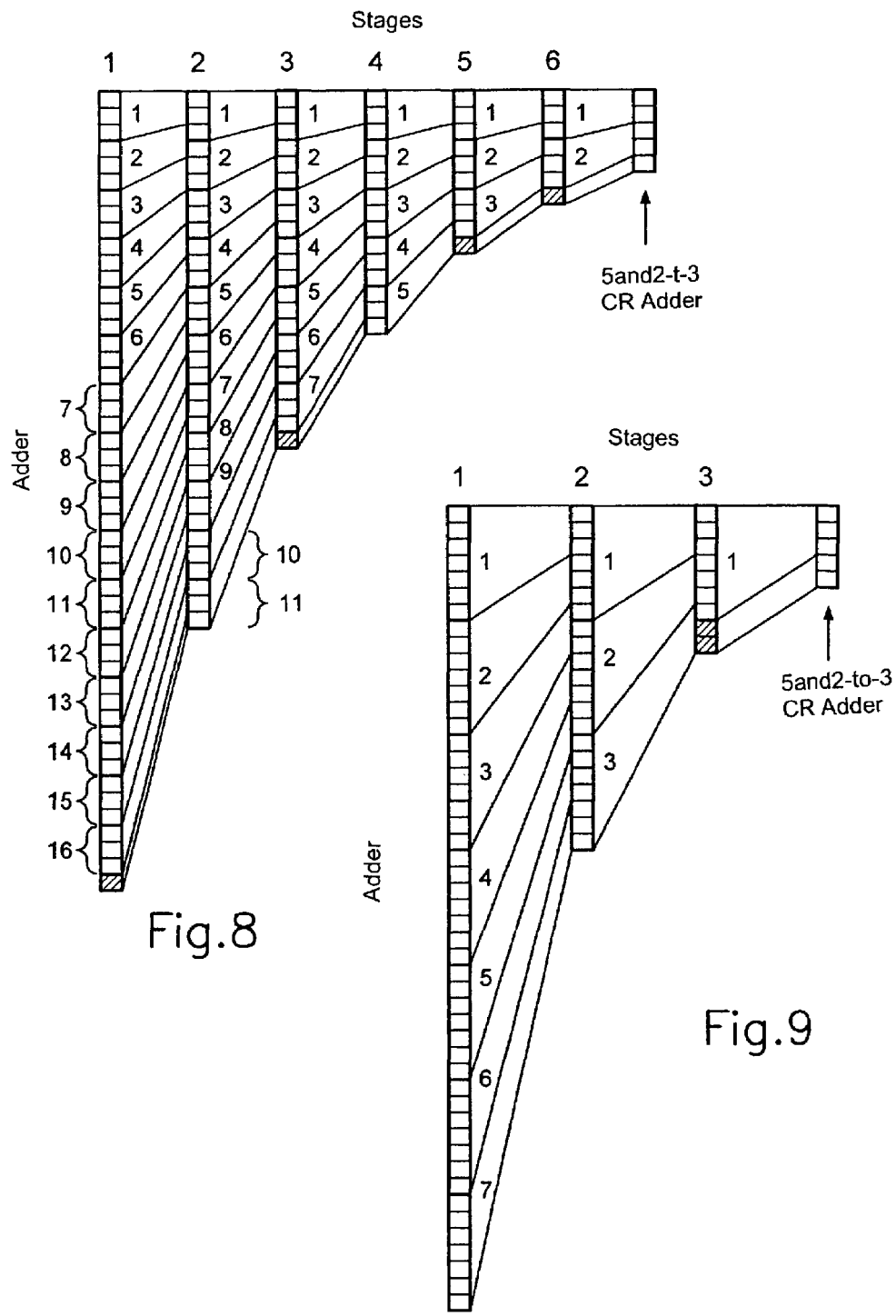
FIG. 8 is a stage diagram for explaining the stage structure of an inventive bit set adder for adding 49 bits having the same significance using a 5and2-to-3 CR adder provided at the output.
FIG. 9 is a stage diagram for explaining the stage structure of an inventive bit set adder for adding 49 bits having the same significance, which is constructed exclusively from 7-to-3 CS adders and a 5and2-to-3 CR adder at the output.

FIG. 8 shows a stage diagram, corresponding to that in FIG. 2, for a bit set adder for adding 49 bits having the same significance. In contrast to FIG. 2, however, the last stage (i.e. in this case the 7th stage) is in the form of a 5and2-to-3 CR adder whose carry inputs ci0 and ci1 are supplied, in line with FIG. 7, with two carry bits from appropriately configured bit set adders for 49 bit sets having the two next lowest significances. In this case, stages 1 to 6 are respectively in the form of 3-to-2 CS adders in line with conventional configuration (see FIG. 1). In comparison to FIG. 2, it becomes clear that only the use of a 5and2-to-3 CR adder instead of a 2and1-to-2 CR adder makes it possible to save three stages in the adder tree.

Stages can also be saved by using CS adders having a greater number of inputs. FIG. 9 shows a stage diagram for a bit set adder constructed from cascaded 7-to-3 CS adders and a 5and2to-3 CR adder as the output stage. The first stage contains seven 7-to-3 CS adders and can thus accept 49 bits having the same significance. The second stage requires another three 7-to-3 CS adders, and the third stage requires a single 7-to-3 CS adder. According to the invention, the fourth stage is produced by a 5and2-to-3 CR adder whose two carry inputs ci0, ci1 again accept two external carries.

Figure 10:
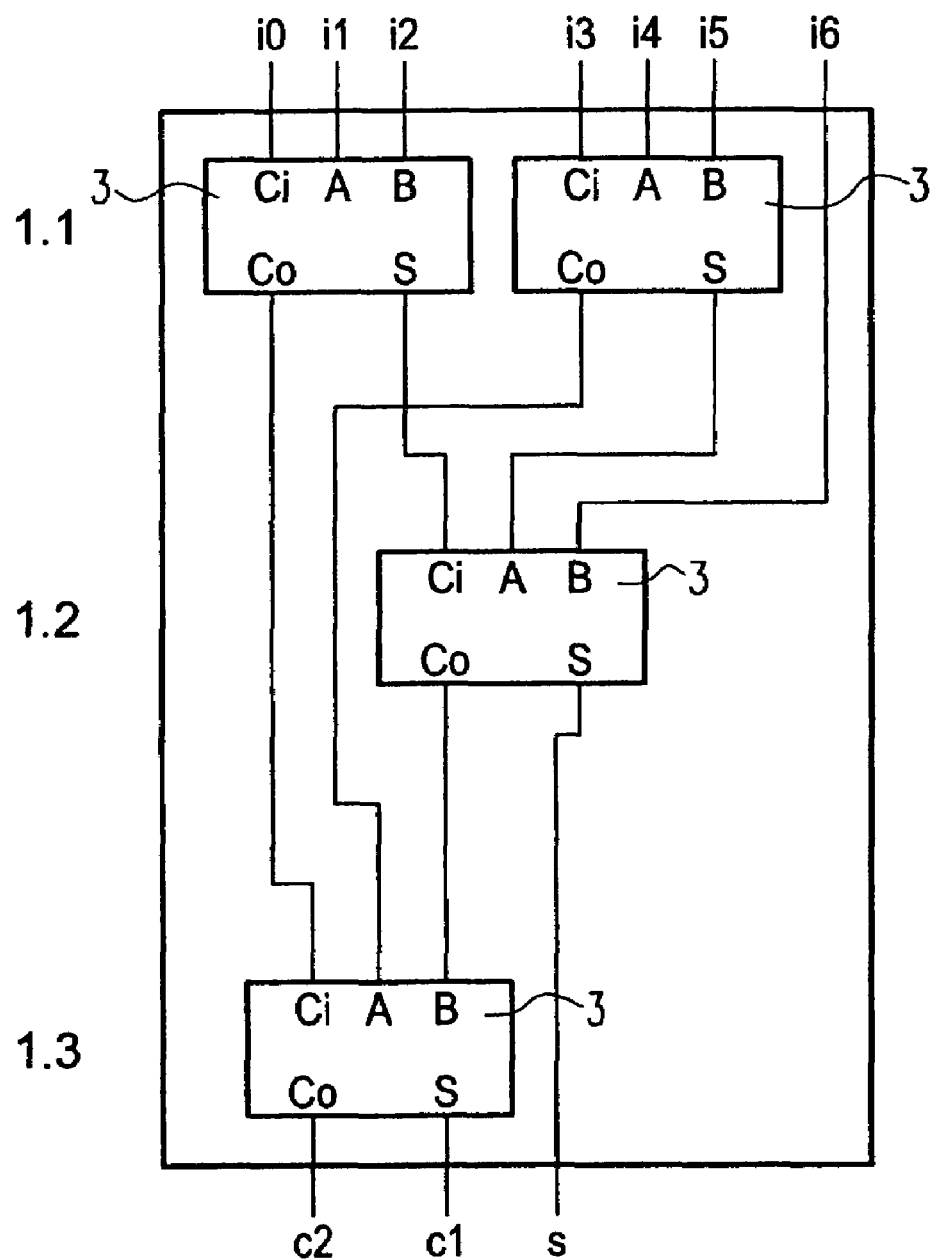
FIG. 10 is a circuit diagram of an implementation of a 7-to-3 CS adder.

FIG. 10 shows, by way of example, one option for producing a 7-to-3 CS adder. The 7-to-3 CS adder has three stages 1.1, 1.2 and 1.3 which are formed from two, one and one 3-to-2 CS full adder(s), respectively. The same or comparable parts and functional groups as in FIG. 1 have been denoted by the same reference symbols. The 7-to-3 CS adder is supplied with seven bits having the same significance at inputs i0, i1, ..., i6. The first six inputs i0 to i5 are connected to the 2×3 inputs of the two 3-to-2 CS adders 3 in the first stage 1.1. The seventh input i6 is connected to one input of the 3-to-2 CS adder 3 in the second stage 1.2. The remaining two inputs A and Ci of this 3-to-2 CS adder 3 are respectively supplied by the sum bit outputs of the two 3-to-2 CS adders 3 in the first stage 1.1.

The sum bit output S of the 3-to-2 CS adder 3 in the second stage 1.2 forms the sum bit output of the 7-to-3 CS adder. The three carry bit outputs of the two 3-to-2 CS adders 3 in the first stage 1.1 and of the 3-to-2 CS adder 3 in the second stage 1.2 are routed to the three inputs of the 3-to-2 CS adder in the third stage 1.3. The sum bit output S of the 3-to-2 CS adder 3 in the third stage 1.3 delivers the bit for the first carry output c1, and the carry bit output Co of this 3-to-2 CS adder 3 delivers the carry bit C2 having the next highest significance from the 7-to-3 CS adder under consideration.

The 7-to-3 CS adder has the same truth table as the 5and2-to-3 CR adder, but all the inputs i0 to i6 are equivalent (i.e. can be interchanged as desired), even in terms of timing.

Figure 11:
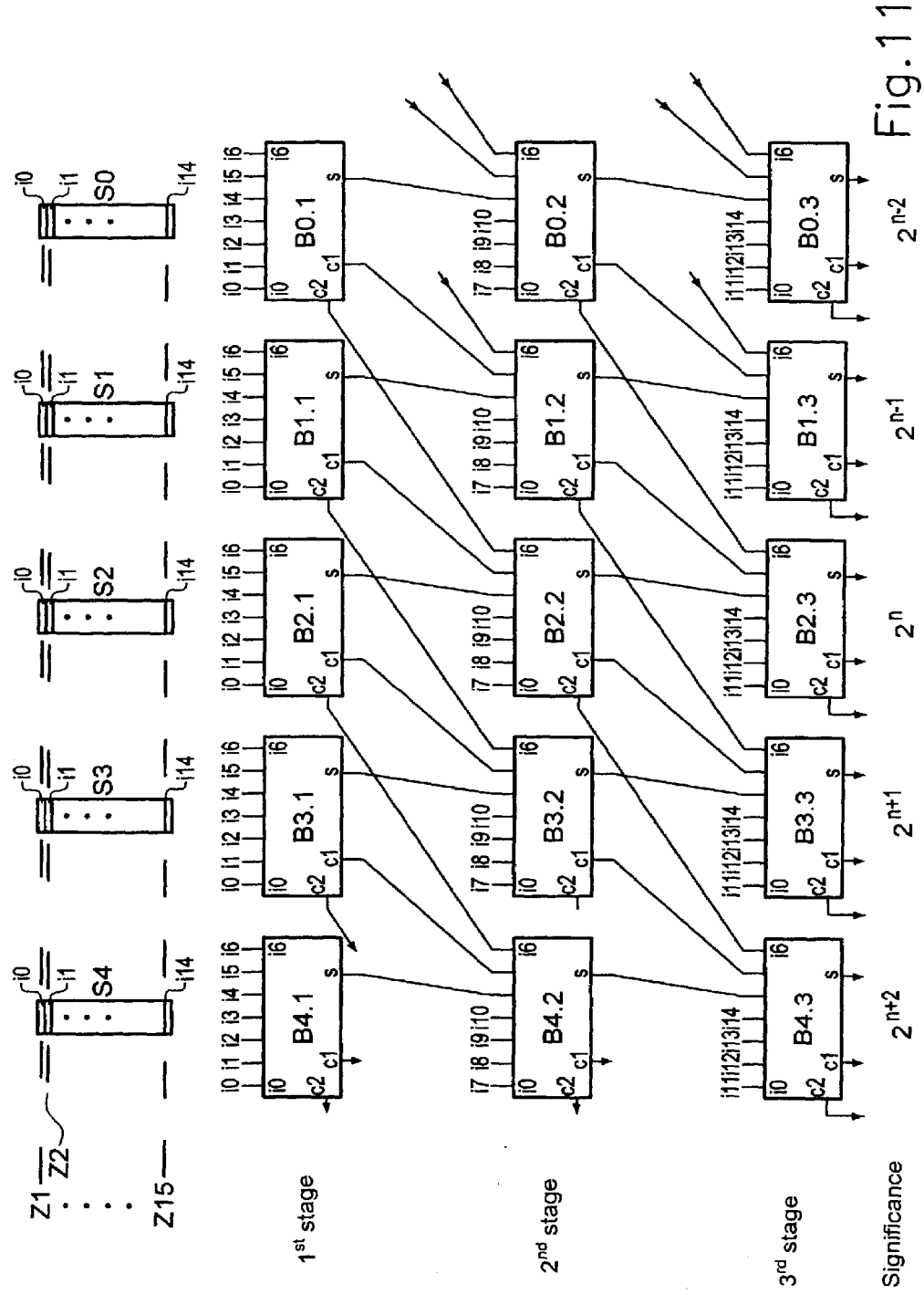
FIG. 11 is a block circuit diagram of an inventive accelerated carry adder constructed from 7-to-3 adders.

FIG. 11 shows a detail, containing exclusively 7-to-3 adders, of a circuit example for an accelerated carry adder. The adder detail shown in FIG. 11 makes it possible to add 15 binary numbers Z1, Z2, ..., Z15 using five binary positions of different significance in each case. The bits having the same significance in the binary numbers Z1, Z2, ..., Z15 have been entered into columns S0, S1, ..., S4. Each column S0, S1, ..., S4 thus contains a bit set containing 15 bits having the same significance.

Below each column S0 to S4, the associated bit set adders are shown. Each bit set adder contains three respective 7-to-3 CS adders in the adder detail shown. The 7-to-3 CS adders provided for adding the bit set in column S0 are denoted by B0.1, B0.2, B0.3, and, using similar notation, the adders associated with the columns S1 to S4 are denoted by B1.1, B1.2, B1.3; B2.1, B2.2, B2.3; B3.1, B3.2, B3.3 and B4.1, B4.2, B4.3.

Of the 15 bits in each column n, n=0, 1, ..., 4, 7 bits are supplied to the inputs i0, i1, ..., i6 of the first CS 7-to-3 adder Bn.1, and another four bits are supplied to four adder inputs (in this case denoted by i7, i8, i9, i10) of the 7-to-3 CS adder Bn.2 in the second stage, and the last four bits of a bit set are supplied to four respective inputs (in this case denoted by the reference symbol i11, i12, i13, i14) of the 7-to-3 CS adder Bn.3 in the third stage.

To take account of the carries, 7-to-3 CS adders in adjacent stages are connected diagonally. Thus, the carry output c1 of the 7-to-3 CS adder B0.1 (which belongs to the first stage) is connected to one input of the 7-to-3 CS adder B1.2 having the next highest significance, which is disposed in the second adder stage. The carry output c2 of the 7-to-3 CS adder B0.1 is connected to one input of the 7-to-3 CS adder B2.2. The 7-to-3 CS adder B2.2 likewise belongs to the second adder stage, but is associated with column S2, i.e. adds bits having a significance which is greater by a factor of 2 than that of the 7-to-3 adder B1.2.

This principle of dual diagonal connection between adjacent stages, taking into account two carries of different significance, is also reflected in the connection of the 7-to-3 CS adders in the second and third stages. The outputs s, c1, c2 of the 7-to-3 CS adders Bn.3 in the third stage respectively output the sum bit s and the two carry bits c1, c2 of different significance.

If the adder is to be configured for adding more than 15 binary numbers, the stage structure illustrated in FIG. 11 can be extended to higher stages. Otherwise, non-illustrated terminal three-bit adders can be used to ascertain and output the respective column sums from the sum bit s, the carry bit c1 having the next lowest significance and the carry bit c2 having the next lowest significance but one.

We claim:

1. A carry ripple adder, comprising:
   five first inputs for receiving five input bits of equal significance w which are to be summed;
   two second inputs for receiving two carry bits;
   a first output for a sum bit having the significance w;
   two second outputs for outputting two further carry bits having significances 2w and 4w; and
   gates interconnecting said first and second inputs to said first and second outputs;
   a maximum number of said gates between any of said second inputs and any of said second outputs being two.

2. The carry ripple adder according to claim 1, wherein a maximum number of said gates between any one of said first inputs and any of said second outputs is five.

3. A carry ripple adder, comprising:
   five first inputs for receiving five input bits of equal significance w which are to be summed;
   two second inputs for receiving two carry bits;
   a first output for a sum bit having the significance w;

two second outputs for outputting two further carry bits having significances 2w and 4w; and gates interconnecting said first and second inputs to said first and second outputs;

a maximum number of said gates between any of said second inputs and said first output being two.

4. The carry ripple adder according to claim 3, wherein a maximum number of said gates between any of said first inputs and any of said second outputs is five.

5. An accelerated carry adder for summing a plurality of bit sets having bits, the bits contained in one bit set have an equivalent same significance and the bits in different ones of the bit sets have different significances, the accelerated carry adder comprising:

bit set adders with a respective bit set adder for each of the bit sets, each of said bit set adders takes into account carries received from the bit sets having a lower significance for calculating a bit having the significance of a respective bit set, at least one of said bit set adders contains an adder output and a carry ripple adder disposed at said adder output, said carry ripple adder including:

five first inputs for receiving five input bits of equal significance w which are to be summed;

two second inputs for receiving two carry bits;

a first output for a sum bit having a significance w;

two second outputs for outputting two further carry bits having significances 2w and 4w; and gates interconnecting said first and second inputs to said first and second outputs;

at least one of said bit set adders being a multistage bit set adder having an output-side stage formed as a 5and2-to-3 carry ripple adder;

said multistage bit set adder having a plurality of stages including said output-side stage, arid said stages up to said output-side stage being constructed from a plurality of 3-to-2 carry save full adders disposed in parallel.

6. An accelerated carry adder for summing a plurality of bit sets having bits, the bits contained in one bit set having an equivalent same significance and the bits in different ones of the bit sets having different significances, the accelerated carry adder comprising:

bit set adders with a respective bit set adder for each of the bit sets, each of said bit set adders taking into account carries received from the bit sets having a lower significance for calculating a bit having the significance of a respective bit set, at least one of said bit set adders containing an adder output and a carry ripple adder disposed at said adder output, said carry ripple adder including:

five first inputs for receiving five input bits of equal significance w which are to be summed;

two second inputs for receiving two carry bits;

a first Output for a sum bit having a significance w;

two second outputs for outputting two further carry bits having significances 2w and 4w; and gates interconnecting said first and second inputs to said first and second outputs;

at least one of said bit set adders being a multistage bit set adder having an output-side stage formed as a 5and2-to-3 carry ripple adder;

said multistage bit set adder having a plurality of stages including said output-side stage, said stages up to said output-side stage being formed from carry save adders having a plurality of outputs for carry bits.

7. The accelerated carry adder according to claim 6, wherein said carry save adders are 7-to-3 carry save adders.

* * * * *